May 31, 1955  C. A. THOMAS  2,709,416
MILKING APPARATUS
Filed July 21, 1951  5 Sheets-Sheet 1

Inventor:
Chester A. Thomas,
By Schroeder, Merriam,
Hofgren & Brady, Attys

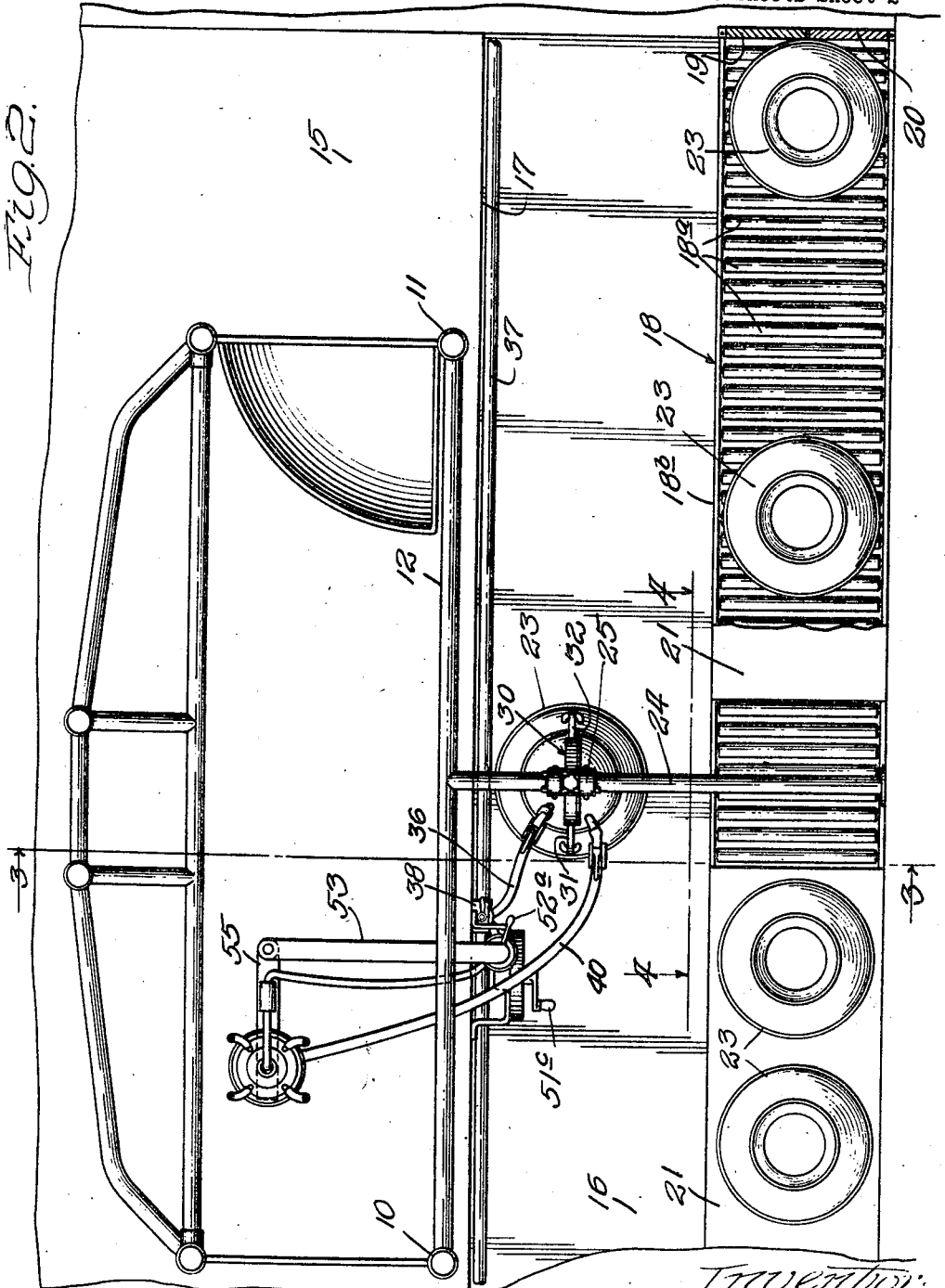

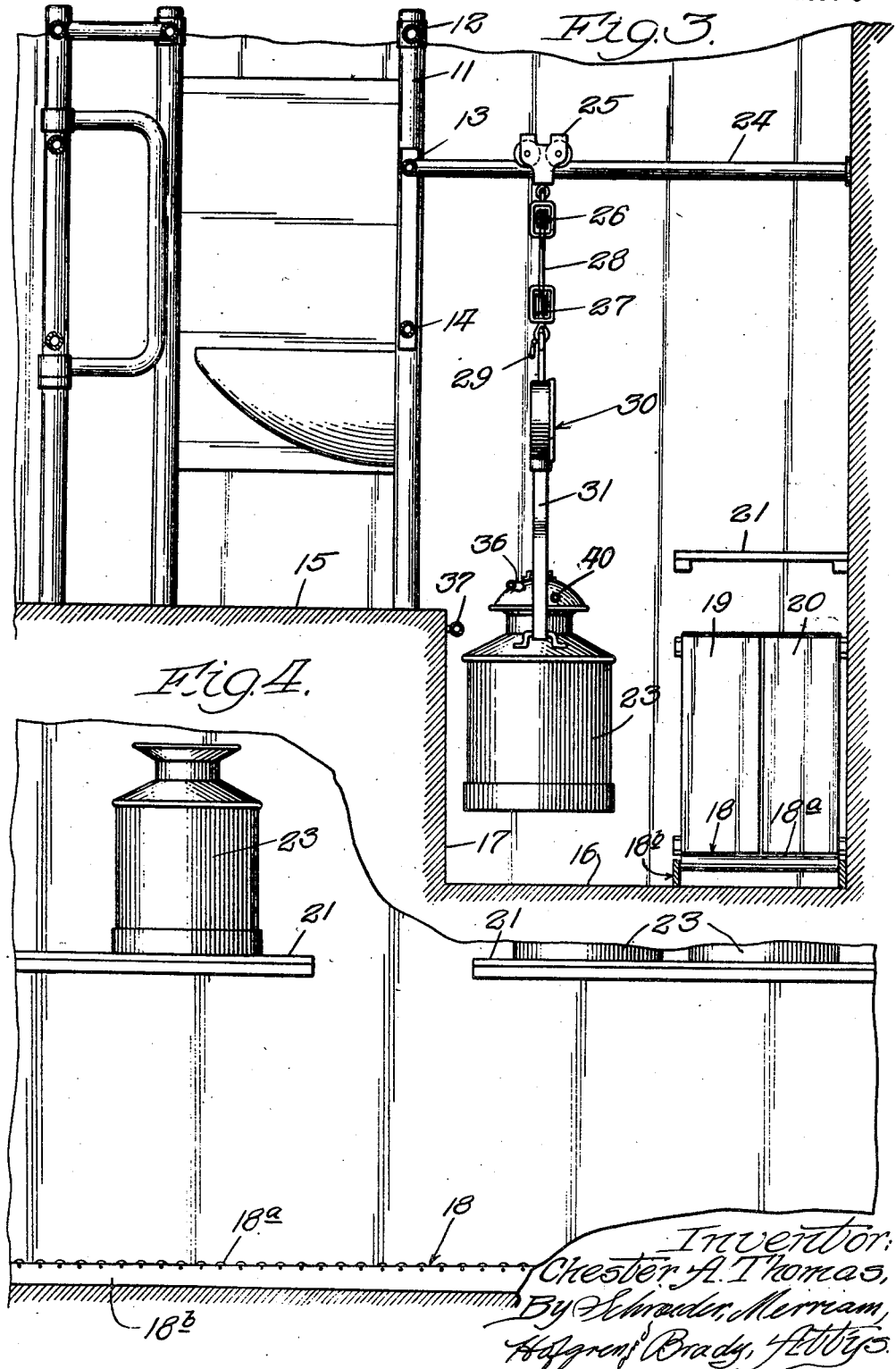

May 31, 1955 C. A. THOMAS 2,709,416
MILKING APPARATUS
Filed July 21, 1951 5 Sheets-Sheet 4
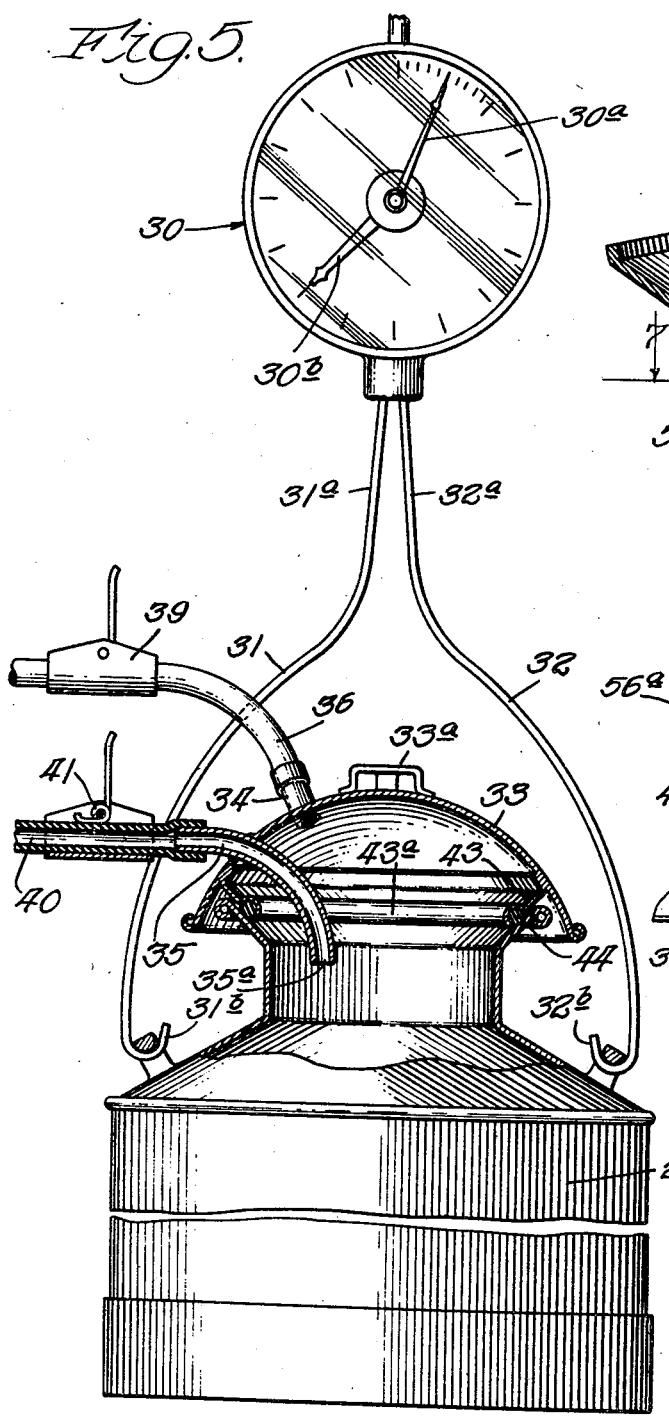
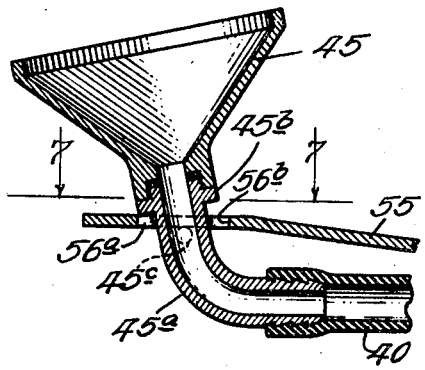
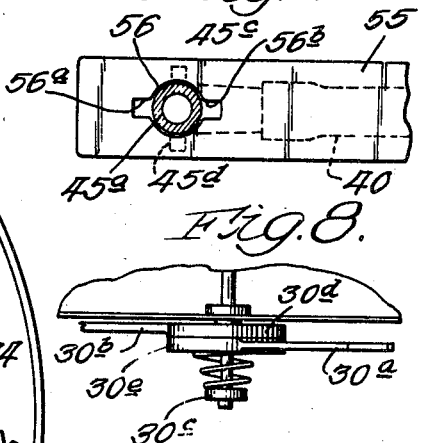
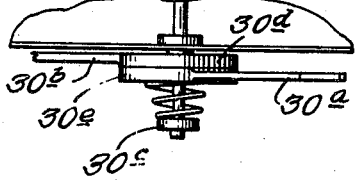

May 31, 1955

C. A. THOMAS 2,709,416

MILKING APPARATUS

Filed July 21, 1951

Inventor:
Chester A. Thomas,
By Schroeder, Merriam,
Hofgren & Brady, Attys.

United States Patent Office 2,709,416
Patented May 31, 1955

2,709,416

MILKING APPARATUS

Chester A. Thomas, Lake Forest, Ill., assignor to Babson Bros. Co., a corporation of Illinois Application July 21, 1951, Serial No. 237,922

11 Claims. (Cl. 119—14.54)

This invention relates to a milking system and apparatus therefor, particularly for use in milking parlors.

This application is a continuation-in-part of my application Serial No. 44,948, filed August 18, 1948.

In milk systems of the carry-away type, where milk is carried away to some delivery point relatively remote from the milk withdrawing arrangement applied to the teats of the animal rather than being delivered directly into a bucket immediately adjacent the teat cup assemblies, it has (prior to my invention forming the subject of the above identified application) been conventional to use a standard claw. Whether the milk was carried only to a nearby final container such as a conventional milk can, or whether it was carried away through a longer pipeline to cans at a remote point, to a hodling tank, or to other equipment, the defects and deficiencies of a claw type milker were previously inherent in carry-away systems.

One such defect in systems previous to the inventions forming the subject matter of this and my above identified application were that there was a solid column of milk leading through the hose or conduit, which column moved back and forth with each pulsation and contraction and expansion of the inflations in the teat cup assemblies. This resulted in relatively sluggish action of the inflations, as contrasted with the efficiency and "snappy" action of the inflations of a suspended bucket milker of the type shown in McCornack Patent 1,859,213, for example; and drew milk back around the teats upon each expansion of the inflations with an undesirable washing of the exterior of the teats by the milk and a reduction in their vacuum hold on the teats themselves. Furthermore, such carry-away systems heretofore were unable to provide the intermittent and automatic downward and forward tug and pull which made the milking action of a suspended bucket milker of the kind described in the above mentioned McCornack patent so efficient.

The milking system disclosed in this application overcomes the above mentioned disadvantages of carry-away systems as known prior to my invention; and for the first time provides at least as much, and perhaps even greater, milking efficiency than a suspended bucket milker, with the conveniences and advantages of a carry-away or pipeline system in maintaining maximum cleanliness and requiring minimum physical effort on the part of the operator.

Other features and advantages of this invention will be apparent from the following specification and the drawings in which:

Figure 2 is a plan view of a portion of the parlor corresponding to Figure 1;

Figure 3 is a transverse vertical sectional view along the line 3—3 of Figure 2;

Figure 4 is a partial side elevational view of the can conveyor and shelves along the line 4—4 of Figure 2;

Figure 5 is a fragmentary enlarged view, partly in section, of the milk can and associated supporting equipment;

Figure 6 is an enlarged fragmentary vertical sectional view of the cup to which the teat cups deliver their milk;

Figure 7 is a fragmentary sectional view along the line 7—7 of Figure 6;

Figure 8 is a fragmentary sectional view of the scale comprising part of the milk can support.

Figure 1:
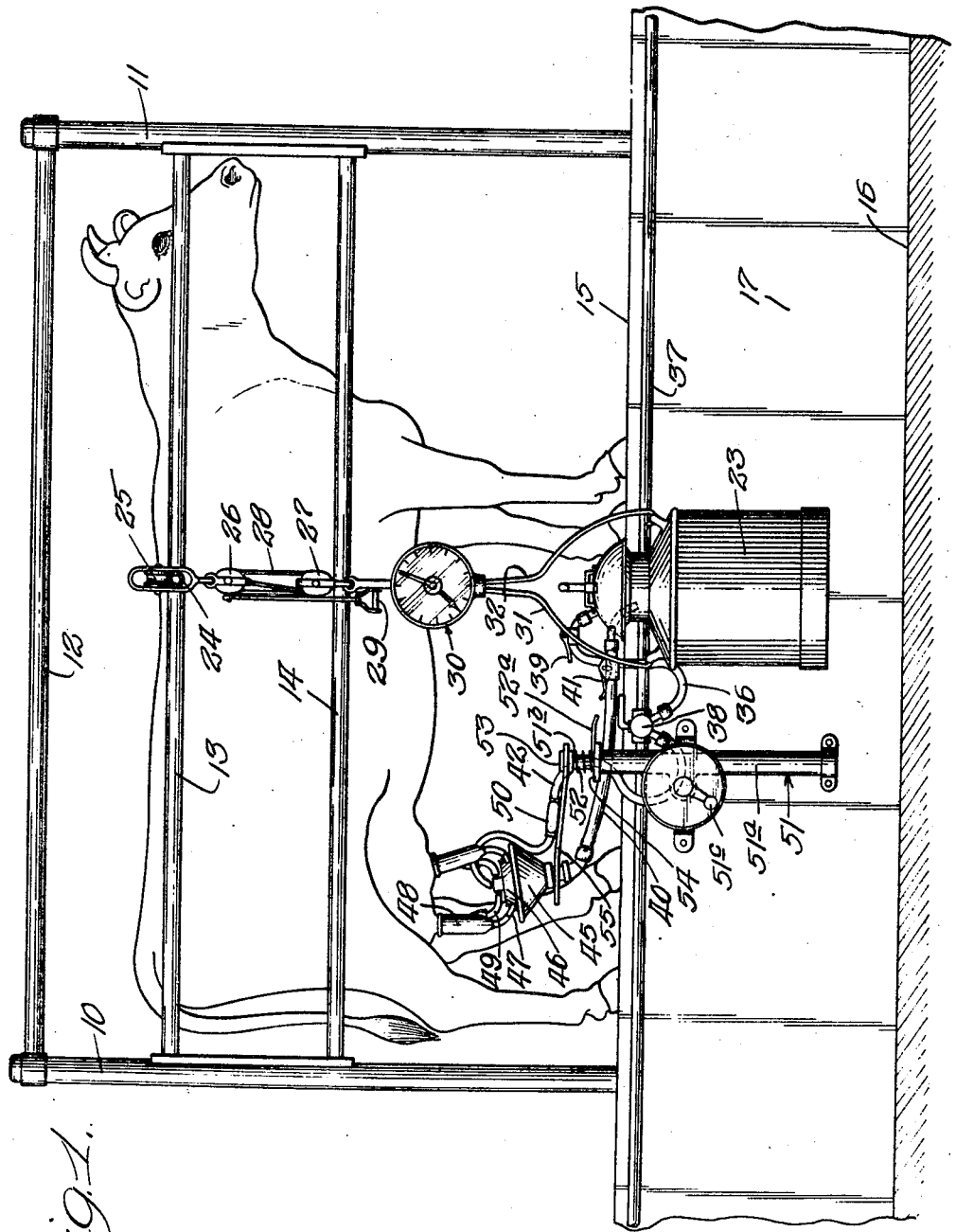
Figure 1 is a fragmentary side elevational view of a part of a milking parlor, showing a single stall and associated apparatus.

The present system as disclosed herein is embodied in a milking parlor employing the drop system, with the cow floor at a higher level than the operator's floor, as may be best seen in Figure 1. Milking parlors of this general type are more fully described, for example, in Babson et al. Patent Re. 22,368, and Babson et al. Patent 2,477,035. In such milking parlors the cows, after any desired preliminary washing of the udder or other preparation, are admitted to a stall, as for example, the stall shown in Figure 1 as including the uprights 10 and 11 and transverse members 12, 13 and 14, the stall being shown in simplified form without the feed manger and chute and without gate operating equipment, for convenience and simplicity of illustration. Reference may be had to the above named or other prior patents for a complete disclosure of a stall which would normally be used in practice.

The cow stands on a floor, identified as 15, which is at some suitable level, as two feet above an operator's floor or alley identified in general as 16, a vertical wall 17 connecting the two floor levels. While I prefer to have a stepped arrangement of stalls and floor edges, as illustrated in the above mentioned patents, the stall is shown parallel to the wall 17 for simplicity of illustration. On the opposite side of the operator's alley 16 from the stall, in the particular embodiment of my invention illustrated in Figures 1 to 8 inclusive, as may be best seen in Figure 2, is a can conveyor here identified in general as 18 and including a plurality of rollers 18a supported at each end in frame members, as 18b. As may be best seen in Figures 3 and 4, the upper surfaces of the rollers 18a are in a plane which slopes toward the swinging doors 19 and 20 sufficiently to cause any can placed on the conveyor to roll toward and through said doors and be delivered into the milk room. As may be best seen in Figures 2 and 4, storage shelves are provided at a height above the conveyor exceeding the height of the can, as the shelves 21 and 22. These shelves are adapted to provide convenient storage for empty milk cans until such time as they are used in the milking operation, the shelves 21 and 22 being separated, opposite the stall, to provide a space through which can supporting means may move in delivering a can from milking position to the conveyor.

The milk can being used in milking, as the can here identified as 23, is here shown as supported in the air by overhead support means including weighing means. This support means is here shown as comprising a track member 24 extending transversely of the operator's alley 16, a runner or pulley arrangement 25 movable thereon, a readily operable lift arrangement, here shown as including a block and tackle arrangement comprising the blocks 26 and 27 and tackle or rope 28 provided with a hand pull 29, a scale indicated in general as 30, and a pair of hooking members 31 and 32 adapted to hook into the handles of the can. This provides means by which a can may be easily hooked onto on the operator's floor, raised to a desired height with its top about level with the cow floor, and moved between a milking position adjacent the wall 17 and a position over the conveyor 18, by a movement of the pulley arrangement along the track 24.

Referring now more particularly to Figure 5, a sealing arrangement is provided adapted to cover and seal the top of the can. This comprises a lid or dome member 33, which may have a handle 33a for convenience, and which is provided with openings into which are welded or otherwise fixed metal tubes 34 and 35. This latter tube comprises the milk delivery tube, and is so curved and of such a length as to extend substantially down into the top of the can, to prevent any possibility of milk being delivered from the end 35a thereof from being drawn into the tube 34 by vacuum in the hose 36. Adjacent and just below the edge of the cow floor 15 is a vacuum line or pipe 37 evacuated by any conventional source, as a vacuum pump and tank, and provided adjacent each stall with connector means here shown as a double cock 38. A hose from one side of this cock 38, the hose 36, connects to the tube 34 to evacuate the can, this hose being provided by a snap clip or shut-off 39. The hose 40 provided with the snap clip or shut-off 41 leads from the milk delivery tube 35 to the milk cup, as does also another vacuum hose from the double cock 38, this latter hose being here identified as 42. The hose 40 should be of large enough internal diameter to permit fast enough flow to substantially empty the cup before the next pulse of milk, but not so large as to permit the presence of too much air therein, a tube with an internal diameter of about a half inch having proved very satisfactory; and this hose can, of course, deliver the milk to a pipeline for ultimate delivery to any desired point, rather than carrying the milk directly to a milk can as illustrated here. The dome or lid 33 is provided with an annular inwardly and downwardly extending flange 43 curved at 43a to retain a sealing gasket 44, as a ring of rubber, which engages the sloping inner surface of the top of the cam 23 and provides a vacuum-tight seal despite irregularities in a given can and irregularities in diameter or slope between the tops of otherwise generally corresponding cans.

Referring now more particularly to Figure 1, a funnel-like member 45, here generally termed the cup is provided with a removable lid 46 sealed thereto and having connector nipples extending therefrom uniformly therearound these being equally spaced and extending out at right angles from a wall section of the lid which is preferably at about 22½° to the axis of the cup. The cup 45 is preferably of transparent material, as Lucite or Plexiglas or other non-shattering and non-cold-flowing transparent plastic, to facilitate checking the progress of milking and the condition of the milk; and it provides a chamber of substantial area or capacity, at least a pint and preferably of the order of a quart or a little over, as a quart and a half, enabling each "pulse" of milk delivered from the inflations, less than a pint even from a "full milker," to separate from the ends thereof and not be drawn back around the teats as the inflation expands and contracts, providing a separation or "break" in the solid column of liquid which might otherwise exist in the conduit leading from the teat cups to the container. One of the nipples is here identified as 47, and it will be understood that it has its outer end so formed as to provide an automatic shut-off arrangement, for example of the type shown in my Patent No. 2,425,901. The nipples provide connection for and receive the ends of inflations of conventional type in conventional shells, as for example the shell 48. Milking is of the double-acting type, alternate evacuation of air from and admission of air to the space between the shell and inner inflation being effected through the hose 42, through small branch hoses to the shell, as the hose 49, by action of the pulsator 50. The presence of the cup or chamber, and the action of the milk in covering the outlet from the cup at each "pulse," advantageously varies the vacuum applied to the teats during each cycle of operation.

Adjacent the vertical wall 17 and carried thereby is a supporting arrangement identified in general as 51, which supporting arrangement may be in general of the type shown in Babson et al. Patent No. Re. 22,368. A tube 51a has a rod 51b rotatable and axially movable therein, axial movement being effected by the adjustment handle 51c and associated mechanism. A helical spring 52, with one end attached to the arm 53 carried by the top of the rod member is adapted to urge the end of the same forwardly of the stall, with a strength adjustable by variation of the position of the end 52a of the spring on a toothed ratchet ring 54. The other or free end of the arm 53 is pivotally connected to the arm 55 which supports the cup or bowl 45 carrying the teat cups. The pivotal connection is such that the arm 55 may swing only in a horizontal plane, and this arm is preferably made of spring steel or similar springy material so that any up and down movement of the cup 45, after the initial height adjustment of the supporting arrangement, is by virtue of the springiness in this arm. The initial height adjustment is made, by means of the handle 51c, in such manner that when the teat cups are in place on the teats there is an upward bending of the arm 55, so that the springiness of this arm provides a definite downward force, assisting the weight of the teat cups and that of the cup or bowl 45, to provide a definite and considerable downward component of pull. As has been mentioned before, the forward component of the pull is provided by the helical spring 52, so that there is a downward and forward pull on the teats during milking which is intermittently varied to some extent by the pulsator action.

As may be best seen in Figures 6 and 7 a connection is provided between the arm 55 and the neck 45a of the cup or bowl such that ready removal and replacement can be effected and so that there is limited universal movement between the parts. The end of the arm 55 is provided with a generally circular opening 56 having slots 56a and 56b on two opposite sides thereof. The neck 45 of the bowl is provided with an upper annular collar 45b of considerably larger diameter than the circular opening 56, and is provided beneath the arm 55 with a pair of oppositely extending studs or trunnions 45c and 45d. In putting the cup 45 on the end of the arm 55 the neck 45a (with the hose 40 removed) is slipped down through the opening 56 until the studs 45c and 45d pass through the slots 56a and 56b, and thereupon it is turned 90° to the position shown in Figure 6, connection of the hose 40 keeping it in this position during milking. As may be seen in Figure 6, limited angular movement (as for example about 20°) is permitted in each direction from a perpendicular relationship of the axis of the cup with respect to the plane of the arm 55. During milking engagement of the studs 45c and 45d with the underside of the arm 55 provides the desired downward pull. Yet if the teat cups lose their hold because the vacuum is broken for any reason and drop off, the arm 55 keeps the arrangement from dropping to the floor and keeps the cup 45 generally upright, so that the teat cups drop down to each side of the cup 45 and shut off automatically.

In milking with this system and apparatus the operator would remove an empty can from the shelf, as 21, and hook the elements 31 and 32 into the handles of the empty can. In the arrangement shown these elements are of spring wire and normally are more widely spaced than the handles of the milk can, and gripping of the parts 31a and 32a and squeezing these together brings the hook parts 31b and 32b into engagement with the handles, where they remain so long as the can is suspended off the floor, the operator effecting this lift by the block and tackle arrangement. The cover or dome 33 would then be put in place on the can and the various cocks or shut-off valves opened. The raising and lowering device would then be adjusted to a height suitable for the cow in the stall, and the teat cups lifted and put on the teats. Milking would then proceed, with all milk entering the cup 45 discharging immediately through the hose 40 into the can. As soon as the cow is milked out the teat cups would be removed, their automatic shut-off action holding the vacuum, and the amount of milk given by the cow read from the scale 30 and noted on the record sheet.

As soon as the next cow was in the stall the cup would be swung into position under her udder and the supporting arrangement adjusted to the proper height, whereupon this cow would then be milked into the same can 23. Before milking of this next cow is started the hand 30a of the scale should be returned to zero position, by rotation of the knob 30c shown in Figure 8. The scale directly operates the totaling hand 30b, there being a spring pressed frictional drive of the hand 30a, by engagement of the discs 30d and 30e, which normally keeps the hands together but enables the hand 30a to be returned to zero position for each succeeding cow. This last mentioned hand therefore provides the weight of milk for each cow, whereas the hand 30b shows the total weight in the milk can at all times.

When the scale shows the can to be nearly full the shut-off valve 39, and also the milk shut-off 41 if necessary, would be closed and the cover 33 removed from the can. The carrier 25 would then be run along the track 24 until the can was over the conveyor 18, whereupon it would be lowered onto the container and the supports unhooked from its handles. The can would then move on down the conveyor and into the milk room, while a new can would be removed from the shelf and the operation repeated.

Figure 9:
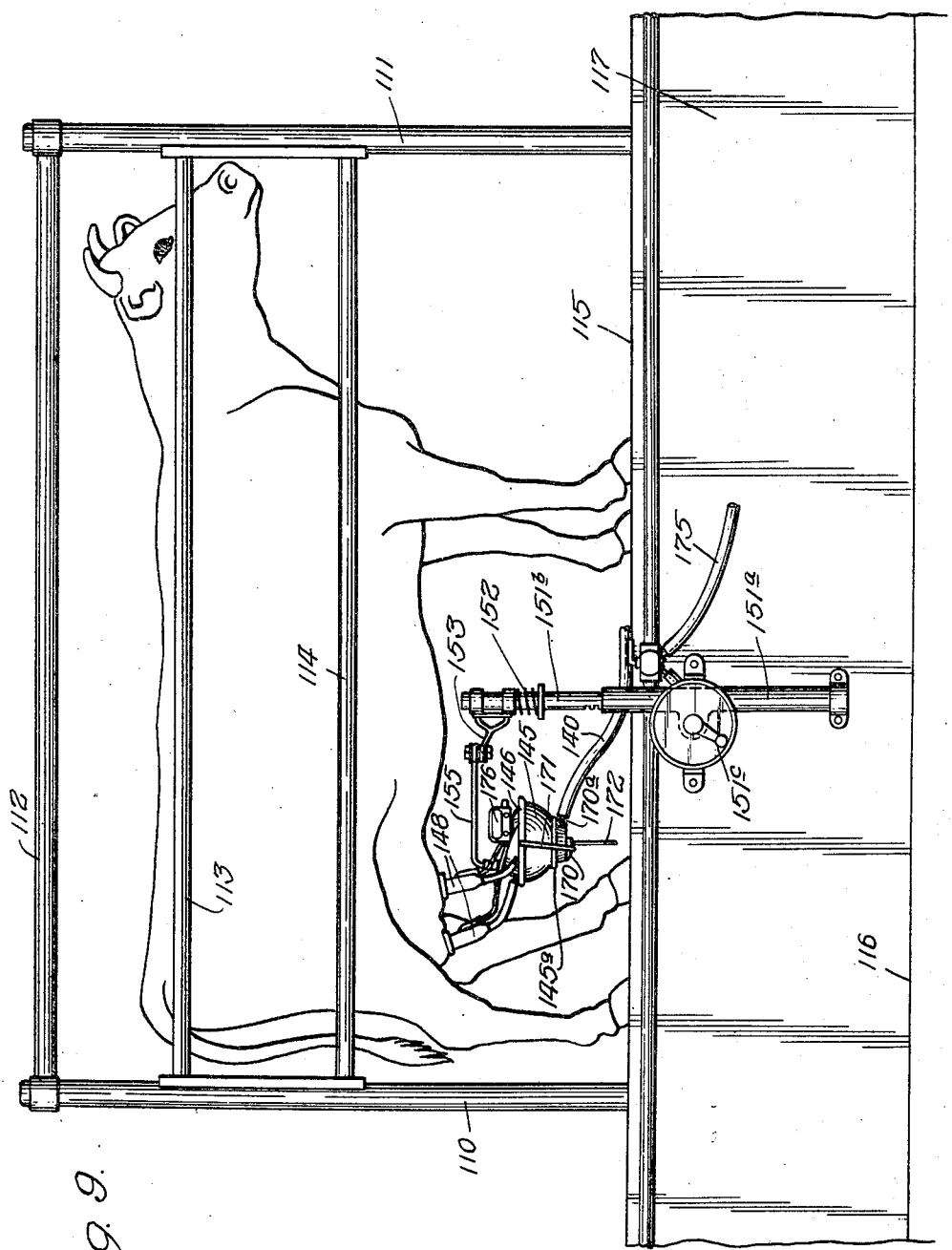
Figure 9 is a fragmentary side elevational view of a part of a milking parlor, generally similar to Figure 1, but showing a different form of milking apparatus.

Another form of carry-away system employing a breaker cup or bowl and embodying the basic principles of my invention, is illustrated in Figure 9.

The particular details of this form of breaker cup, the location of the milk tube connector nipples, and the support for the bowl are more particularly described and claimed in my copending application Serial No. 219,692 filed April 6, 1951, in turn a continuation in part of my application Serial No. 208,869, filed February 1, 1951, so that the present description thereof will be made somewhat more general than would otherwise be the case. As is more fully described in my copending application Serial No. 219,692, the breaker cup may be readily disassembled from the lid and base for convenience in cleaning, and the connector nipples are arranged in an arc toward the rear of the cow to facilitate the downward and forward tug and pull, particularly on the two forward teats.

Using reference numerals 100 higher for convenience of correlation of the parts with the previous more complete description of the system illustrated in Figures 1 to 8, it will be seen that the stall again comprises uprights 110 and 111 on the operator's side with intermediate horizontal members here identified as 112, 113 and 114, it being understood that the stall is shown in very simplified form for convenience of illustration. The cow again stands on a cow floor here identified as 115 at a suitable height above an operator's floor, here identified as 116.

The system again includes four identical teat cup assemblies here being identified in general as 148. The milk tubes of these assemblies are in this figure connected to nipples extending in an arc of about 100° from that portion of a lid 146 facing toward the rear of the cow. The lid is fastened to the top of a transparent plastic bowl or breaker cup element 145, the bottom 145a making engagement with a base 170, the lid, intermediate bowl portion and base being all held together in sealed relationship by means here shown as a snap-bail 171. A movable leg 172 may be used, if desired, to keep the bowl spaced a certain distance above the floor. A nipple 170a extending from the base of the breaker cup connects to a milk hose 140 adapted to carry the milk away to any desired point, whether to a can or container close to the stall, or through a pipeline to cans, a holding tank, or a cooler, or the like, at some remote point.

The adjustable supporting arrangement illustrated here is in general similar to that heretofore described in connection with the embodiment of the invention illustrated in Figures 1 to 8 and more fully shown and claimed in Babson et al. Reissue Patent No. 22,368. This is here shown as mounted on the wall 117 and comprising a tubular member 151a with a rod member 151b telescoping therein and capable of vertical adjustment through a rack and gear arrangement by manipulation of the handle 151c. A helical torsion spring 152 urges the far end of the arm 153 forwardly of the cow, this arm being pivotally connected to the backwardly extending arm 155 which in this case is connected to the lid of the bowl to support the breaker bowl in the manner more fully described in my application Ser. No. 219,692. It will be understood, of course, that suitable vacuum (as for example 13 inches) is applied to the milk conduit or hose 140, and that a somewhat higher vacuum (as for example 15 inches) may exist in the line 174 and be applied through the hose 175 to the pulsator 176 to achieve the desired inflation action in accordance with conventional double action milker principles.

In both forms of my invention illustrated and disclosed here, and in other forms which may embody my invention, it is desirable to have a bowl of a capacity of the order of one or one and a half quarts with a depth of the same order as its diameter and preferably at least one-half its diameter. This, coupled with the fact that no other vacuum opening is provided into the bowl other than that leading through the milk tube, breaks the column of milk and provides an "air" cushion or space above the level of milk in the bowl, at least the upper half of the bowl normally containing such air cushion, or such cushion with a little foam; and the liquid milk being normally only in the lower part of the breaker cup. This enables the inflations directly connected to the lid to deliver pulses of milk into an open space or air space (at sub-atmospheric pressure, of course) and to have the "snappy" expansion and contraction heretofore associated only with a suspended bucket type of milker. The fact that the bowl has dimensions of the same general order in all directions minimizes any tendency which a slight tipping or swinging of the bowl might have toward moving liquid milk back into any of the connector nipples, any such undesirable action being practically impossible with the type of breaker cups illustrated. Moreover, whether the breaker cup arrangement is supported from above as illustrated in Figure 9, or from below as illustrated in Figure 1, the supporting arrangement is adapted to provide a downward and forward pull which can be adjusted to optimum milking conditions even at the very beginning of the milk delivery; and at the same time provides a support which prevents any undesirable dropping of the ends of the teat cup assemblies onto the floor.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Milking apparatus of the character described, including: means operably connectable to an animal's teats for withdrawing milk therefrom, this means comprising teat cup assemblies each comprising a shell and an inflation therein having a milk tube; a delivery station spaced therefrom; conduit means operably connected between said teat cup assemblies and said delivery station providing a passageway for delivering milk to said delivery station; pulsator means including an evacuated portion for effecting pulsations of said inflations; and a cup member defining a generally closed chamber of substantial size approximately at said teat cup assemblies and having openings in the top thereof directly connected to the milk tubes thereof and an outlet at the bottom thereof and forming a part of said conduit means, said chamber being sealed from the evacuated portion of said pulsator means and normally opening only to the milk tubes of the teat cup assemblies and to the remainder of the milk delivery passageway and being of at least sufficient size to contain all the milk delivered from the teats at one pulsation or operation of the milking apparatus thereby causing a separation in the solid column of milk which would otherwise extend from said teats through said conduit during operation of the milking apparatus, but substantially smaller than that necessary to hold all of the milk delivered at one milking, said milk withdrawing means, chamber and conduit forming a continuous evacuated system during the entire milking operation.

2. Milking apparatus of the character described, including: means operably connectable to an animal's teats for withdrawing milk therefrom, this means comprising teat cup assemblies each comprising a shell and an inflation therein having a milk tube; a delivery station spaced therefrom; conduit means operably connected between said teat cup assemblies and said delivery station providing a passageway for delivering milk to said delivery station; and a cup member defining a chamber of a capacity of the order of a quart approximately at said teat cup assemblies and directly connected at its top to the milk tubes thereof and forming a part of said conduit means, said chamber normally opening only to the milk tubes of the teat cup assemblies and to the remainder of the milk delivery passageway and separating the solid column of milk which would otherwise extend from said teats through said conduit during operation of the milking apparatus, said milk withdrawing means, chamber and conduit forming a continuous evacuated system during the entire milking operation.

3. Apparatus of the character claimed in claim 2 wherein the length, breadth and depth of the chamber are dimensions of the same order, and the outlet conduit has an internal diameter of the order of a half inch.

4. Milking apparatus of the character described, including: means operably connectable to an animal's teats for withdrawing milk therefrom, this means comprising teat cup assemblies each comprising a shell and an inflation therein having a milk tube; a delivery station spaced therefrom; pulsator means including an evacuated portion for effecting pulsations of said inflations; conduit means operably connected between said teat cups and said delivery station providing a passageway for delivering milk to said delivery station; and a cup member defining a generally closed chamber of substantial size approximately at said teat cups and having the top thereof directly connected to the milk tubes thereof and an outlet at the bottom thereof and forming a part of said conduit means, said chamber being sealed from the evacuated portion of said pulsator means and of at least sufficient size to contain all the milk delivered from the teats at one pulsation or operation of the milking apparatus, said conduit, chamber and milk withdrawing means forming a continuous evacuated system during milking.

5. Milking apparatus of the character described, including: means operably connectable to an animal's teats for withdrawing milk therefrom, this means comprising teat cup assemblies each comprising a shell and an inflation therein having a milk tube; a delivery station spaced therefrom; conduit means operably connected between said teat cups and said delivery station providing a passageway for delivering milk to said delivery station; a cup member defining a chamber of substantial size approximately at said teat cups and forming a part of said conduit means, said chamber being of at least sufficient size to contain all the milk delivered from the teats at one pulsation or operation of the milking apparatus and separating the solid column of liquid which might otherwise exist in said conduit during operation of the milking apparatus, said conduit, chamber and milk withdrawing means forming a continuous evacuated system during milking; and supporting means operably connected to said withdrawing means to apply a pull having a downward component to the teats during milking and to prevent the teat cups from falling to the floor upon separation from the teats.

6. Milking apparatus of the character described, including: means operably connectable to an animal's teats for withdrawing milk therefrom, this means comprising teat cup assemblies each comprising a shell and an inflation therein having a milk tube; a delivery station spaced therefrom; conduit means operably connected between said teat cups and said delivery station providing a passageway for delivering milk to said delivery station; a cup member defining a chamber of a capacity of the order of a quart or a little over approximately at said teat cups and directly connected to the milk tubes thereof and forming part of said conduit, said chamber being of at least sufficient size to contain all the milk delivered from the teats at one pulsation or operation of the milking apparatus for providing a separation in the solid column of liquid which might otherwise exist in said conduit during operation of the milking apparatus, said conduit, chamber and milk withdrawing means forming a continuous evacuated system during milking; and supporting means operably connected to said withdrawing means to apply a pull having a downward component to the teats during milking and to prevent the teat cups from falling to the floor upon separation from the teats.

7. Milking apparatus of the character described, including: means operably connectable to an animal's teats for withdrawing milk therefrom, this means comprising teat cup assemblies each comprising a shell and an inflation therein having a milk tube; a delivery station spaced therefrom; conduit means operably connected between said teat cups and said delivery station providing a passageway for delivering milk to said delivery station; a cup member defining a chamber of substantial size approximately at said teat cups and directly connected to the milk tubes thereof and forming a part of said conduit means, said chamber being of at least sufficient size to contain all the milk delivered from the teats at one pulsation or operation of the milking apparatus for providing a separation in the solid column of liquid which might otherwise exist in said conduit during operation of the milking apparatus, said conduit, chamber and milk withdrawing means forming a continuous evacuated system during milking; and resilient means operably connected to said withdrawing means to apply a pull having a downward component to the teats during milking and including a support member having limited movement adapted to prevent the teat cups from falling to the floor upon separation from the teats.

8. Milking apparatus of the character described, including: means operably connectable to an animal's teats for withdrawing milk therefrom, this means comprising teat cup assemblies each comprising a shell and an inflation therein having a milk tube; a container operably connectable to said withdrawing means and substantially spaced from said cups for receiving said milk; conduit means operably connected between said teat cups and said container providing a passageway for milk from said teat cups to said container; a cup member defining a chamber of at least a pint capacity but only a small fraction of that necessary to hold all of the milk delivered at one milking and approximately at said teat cups and forming a part of said conduit means for providing a separation in the solid column of liquid which might otherwise exist in said conduit during operation of the milking apparatus, said conduit, container, chamber and milk withdrawing means forming a continuous evacuated system during milking; and separate means independent of said milk delivery conduit means for effecting pulsations of said inflations.

9. Milking apparatus of the character described, including: means operably connectable to an animal's teats for withdrawing milk therefrom, this means comprising teat cup assemblies each comprising a shell and an inflation therein having a milk tube; a final container operably connectable to said withdrawing means and adapted to have milk leave the farm therein; conduit means operably connected between said withdrawing means and said container providing a passageway for milk from said teat cups to said container; pulsator means including an evacuated portion for effecting pulsations of said inflations; a cup member defining a chamber of substantial size approximately at said teat cups and forming a part of said conduit means, said chamber being sealed from the evacuated portion of said pulsator means and of at least sufficient size to provide a separation in the solid column of liquid which might otherwise exist in said conduit during operation of the milking apparatus, said conduit, container, chamber and milk withdrawing means forming a continuous evacuated system during milking.

10. Milking apparatus of the character described, including: means operably connectable to an animal's teats for withdrawing milk therefrom this means comprising teat cup assemblies each comprising a shell and an inflation therein having a milk tube; a container substantially spaced from and operably connected to teat cups for receiving said milk; conduit means operably connected between said teat cups and said container providing a passageway for milk from said teat cups to said container; pulsator means including an evacuated portion for effecting pulsations of said inflations; and a cup member defining a chamber of substantial size approximately at said teat cups and forming a portion of said conduit means, said chamber being sealed from the evacuated portion of said pulsator means and of at least sufficient size to contain all the milk delivered from the teats at one pulsation or operation of the milking apparatus for providing a separation in the solid column of liquid which might otherwise exist in said conduit during operation of the milking apparatus, said conduit, container, chamber and milk withdrawing means forming a continuous evacuated system during milking.

11. Milking apparatus of the character described, including: means operably connectable to an animal's teats for withdrawing milk therefrom, this means comprising teat cup assemblies each comprising a shell and an inflation therein having a milk tube; a delivery station spaced therefrom; conduit means operably connected between said teat cup assemblies and said delivery station providing a passageway for delivering milk to said delivery station; a cup member approximately at said teat cup assemblies and directly connected to the milk tubes thereof and having an outlet connected to and forming a part of said single conduit means, said cup member defining a chamber of at least a pint capacity between the milk tube connections and said outlet, said chamber normally opening only to the milk tubes of the teat cup assemblies and to the remainder of the milk delivery passageway and separating the solid column of milk which would otherwise extend from said teats through said conduit during operation of the milking apparatus, said milk withdrawing means, chamber and conduit forming a continuous evacuated system during the entire milking operation; and separate means independent of said milk delivery conduit means for effecting pulsations of said inflations.

References Cited in the file of this patent

UNITED STATES PATENTS

| Number | Name | Date |
|---|---|---|
| 594,860 | Cushman | Dec. 7, 1897 |
| 655,200 | Condron | Aug. 7, 1900 |
| 777,102 | Howell et al. | Dec. 13, 1904 |
| 798,608 | Hoover | Sept. 5, 1905 |
| 961,960 | Hicks | June 21, 1910 |
| 1,155,131 | Cockburn | Sept. 28, 1915 |
| 1,195,995 | Leitch | Aug. 29, 1916 |
| 1,210,468 | Harner | Jan. 2, 1917 |
| 1,239,407 | Larsen | Sept. 4, 1917 |
| 1,240,765 | Norris | Sept. 18, 1917 |
| 1,396,987 | Bodeker | Nov. 15, 1921 |
| 1,400,792 | Blackmore | Dec. 20, 1921 |
| 1,432,654 | Anderson | Oct. 17, 1922 |
| 1,536,634 | Shippert et al. | May 5, 1925 |
| 1,603,429 | Uphaus et al. | Oct. 19, 1926 |
| 1,633,953 | Preston | June 28, 1927 |
| 1,719,395 | Dugas | July 2, 1929 |
| 1,859,214 | McCornack | May 17, 1932 |
| 1,992,807 | Benson | Feb. 26, 1935 |
| 2,102,267 | Hodsdon | Dec. 14, 1937 |
| 2,136,228 | Babson et al. | Nov. 8, 1938 |
| 2,366,273 | Lowry | Jan. 2, 1945 |
| 2,472,122 | Polivka | June 7, 1949 |
| 2,610,608 | Graves | Sept. 16, 1952 |

FOREIGN PATENTS

| Number | Country | Date |
|---|---|---|
| 322,202 | Great Britain | Dec. 2, 1929 |

OTHER REFERENCES

Starline Milking Parlor Stalls, January 21, 1933.
Farm Implement and Machinery Review, November 1, 1946, page 645, Tandem Milking Revived.